(No Model.)
W. S. BELDING.
POWER TRANSMITTING MECHANISM.
No. 433,394. Patented July 29, 1890.
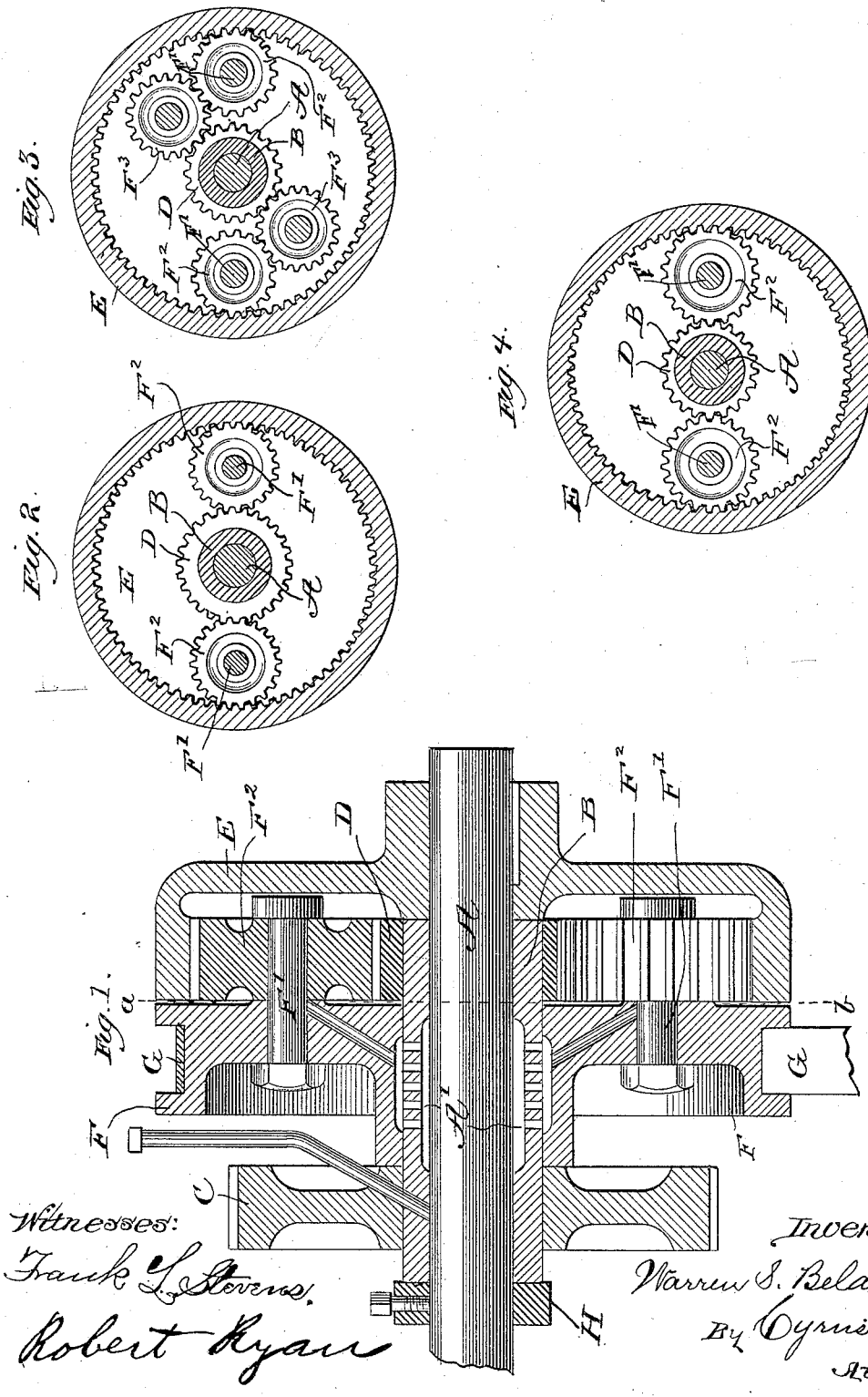
Witnesses:
Frank L. Stevens
Robert Ryan
Inventor:
Warren S. Belding
By Cyrus Kehr
Atty.

UNITED STATES PATENT OFFICE.

WARREN S. BELDING, OF CHICAGO, ILLINOIS.

POWER-TRANSMITTING MECHANISM.

SPECIFICATION forming part of Letters Patent No. 433,394, dated July 29, 1890.

Application filed April 28, 1890. Serial No. 349,820. (No model.)

*To all whom it may concern:*

Be it known that I, WARREN S. BELDING, a citizen of the United States, residing at Chicago, in the county of Cook and State of Illinois, have invented certain new and useful Improvements in Power-Transmitting Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to power-transmitting mechanism in which a portion of the mechanism is operated continuously while the power is transmitted at will to other parts. The apparatus may be used for transmitting power to a shaft or for taking power from a continuously-rotating shaft to operate other mechanism.

In the accompanying drawings, Figure 1 is a longitudinal section through the mechanism. Fig. 2 is a transverse section on a smaller scale in line *a b* of Fig. 1. Figs. 3 and 4 are modifications of Fig. 2.

In said drawings, A is a shaft, to which power is to be imparted or from which power is to be taken.

The apparatus is to be considered first in its application to imparting power to the shaft A.

B is a sleeve or hollow shaft loosely surrounding the shaft A or axially in line therewith. For the purpose of aiding lubrication, the internal diameter of said shaft B is increased along its middle, so as to leave a space A' for oil between the shaft A and the shaft B.

C is a wheel surrounding the shaft B and keyed or otherwise rigidly secured thereto. Said wheel may be a gear-wheel to be driven by other gears, or it may be a pulley to be driven by a belt or chain, or it may be driven by any other means—as, for example, friction or electro magnetism.

At one end of the shaft B is mounted a spur-gear D. This is keyed upon said shaft B, so as to rotate with said shaft. Adjacent to said end of the shaft B a wheel E is mounted directly upon the shaft A and keyed thereto, so as to rotate with said shaft. Said wheel E has an internal gear-flange about its circumference directed over the wheel D at a considerable distance from the periphery of the latter. Adjacent to the inner side of said wheel D is a band-wheel F, loosely surrounding the shaft B and of about the same diameter as the wheel E. Said wheel F has one or more studs F', extending at right angles to its plane into the space between the wheel D and the internal gear of the wheel E, and each such stud supports an idle spur-gear $F^2$, meshing into the internal gear of the wheel E and in the form shown in Fig. 2, each of said wheels $F^2$ also meshes into the spur-wheel D. In Fig. 3 the wheels $F^2$ do not mesh directly into the wheel D; but an intermediate idle spur-wheel $F^3$ is so located as to mesh into the adjacent wheel $F^2$ and the wheel D, so that said wheels $F^2$ and D operate upon each other through the medium of said wheel $F^3$. By this modification the mechanism is made to operate in a direction opposite to that in which the mechanism shown in Fig. 2 operates.

G is an ordinary friction-strap arranged to engage the periphery of the wheel F, and is provided with suitable means for forcing it into contact with said wheel.

H is a fixed collar surrounding the shaft A at the end of the sleeve B opposite the wheel E to keep said sleeve in its position.

The operation is as follows: Supposing power to be applied constantly to the wheel C. Then said wheel, the shaft B, and the spur-wheel D will rotate in unison. If the form shown in Fig. 2 is used, the spur-wheel D will rotate the idle-wheels $F^2$ in an opposite direction, and since the latter mesh into the internal gear of the wheel E, the latter must be turned by the idle-wheel $F^2$, or said wheel E must offer sufficient resistance to cause the wheel $F^2$ to travel upon said internal gear and turn the band-wheel F upon the shaft B. When the brake-strap G does not engage the wheel F, the resistance of the latter is so small as to allow it to turn upon the shaft B in response to the force exerted by the wheel D and the resistance offered by the wheel E; but when the brake-strap G is drawn the wheel F is held rigidly and the wheels $F^2$ are no longer free to revolve around the internal gear of the wheel E. Consequently the wheel D acts positively upon the internal gear of the wheel E through the wheels $F^2$, thus rotating the wheel E and also the shaft A, to which the wheel E is keyed. Supposing the wheels C and D to be rotating in either direction. Then the wheels $F^2$ will rotate in the opposite direction, and the periphery of the latter will carry the wheel E in the opposite direction also, and, since the wheel E is keyed to the shaft A, the latter will also be rotated in the direction opposite the direction in which the wheels C and D rotate. Looking at the gearing of Fig. 3, it will be seen that the wheel D will rotate the wheel $F^3$ in an opposite direction, while the latter will rotate the wheels $F^2$ in the same direction, and that the latter will rotate the wheel E and the shaft A in the same direction as the direction in which the wheels C and D rotate. It is apparent then that the shaft A may be at rest while the wheel C is running in response to the extraneous power applied to it, and that if it is desired to rotate said shaft the brake-wheel is to be engaged. It is to be noted also that the rotation of the wheel E in the same direction as the wheel C, but intermittently and at a different velocity, may be made the ultimate object of the mechanism.

The operation of the mechanism may be reversed. Suppose the shaft A to be rotating continuously in one direction. Then the wheel C may be rotated intermittently at a higher velocity. The difference in velocity between the wheel C on the one hand and the wheel E or shaft A on the other hand may be varied by varying the relative sizes of the wheels. Fig. 2 shows these wheels differing relatively in dimensions from the similar wheels in Fig. 4.

Another application for power-transmitting mechanism, filed by me February 21, 1890, and bearing the Serial No. 341,426, shows a duplex mechanism consisting of two members, each composed of the mechanism shown in this application, said members differing from each other in motion either as to direction or velocity or both. All excepting claim 7 of said application are restricted to the duplex form of the mechanism, and said claim 7 is restricted to a combination embodying the means for lubricating described in said application. This application is, broadly, for the group of mechanical parts herein shown, whether only a single group is used or whether two groups are associated, as in said other application. The individual members of said duplex mechanism are therefore to be regarded as coming within the scope of this application.

I claim as my invention—

1. The combination, with a shaft B, of a wheel C, mounted upon said shaft, a shaft A, axially in line with said shaft B, a wheel E, constructed substantially as described and mounted upon said shaft A, a wheel D, mounted upon said shaft B adjacent to said wheel E, a loose brake-wheel F, arranged axially in line with said shaft and wheel E, and idle spur-gears located between and engaging with the wheels D and E and supported by said brake-wheel F, substantially as shown and described.

2. The combination, with a shaft B, of a wheel C, mounted upon said shaft, a shaft A, extending through the shaft B, a wheel E, constructed substantially as described and mounted upon said shaft A, a wheel D, mounted upon said shaft B adjacent to said wheel E, a loose brake-wheel F, surrounding the shaft B, and idle spur-gears located between and engaging with the wheels D and E and supported by said brake-wheel F, substantially as shown and described.

3. The combination, with a shaft B, of a wheel C, mounted upon said shaft, a wheel E, constructed substantially as described and arranged axially in line with said shaft, a wheel D, mounted upon said shaft adjacent to the wheel E, a loose brake-wheel F, arranged axially in line with said shaft and said wheel E, and two idle spur-gears supported by said wheel F and meshing into each other, and one meshing into said wheel D and the other meshing into said wheel E, substantially as described.

4. The combination, with a shaft B, of a wheel C, mounted upon said shaft, a shaft A, axially in line with said shaft B, a wheel E, constructed substantially as described and mounted upon said shaft A, a wheel D, mounted upon said shaft B adjacent to said wheel E, a loose brake-wheel F, arranged axially in line with said shaft and wheel E, and two idle spur-gears supported by said wheel F and meshing into each other, and one meshing into said wheel D and the other meshing into said wheel E, substantially as described.

5. The combination, with a shaft B, of a wheel C, mounted upon said shaft, a shaft A, extending through said shaft B, a wheel E, constructed substantially as described and mounted upon said shaft A, a wheel D, mounted upon said shaft B adjacent to said wheel E, a loose brake-wheel F, surrounding said shaft B, and two idle spur-gears supported by said wheel F and meshing into each other, and one meshing into said wheel D and the other meshing into said wheel E, substantially as described.

In testimony whereof I affix my signature, in presence of two witnesses, this 26th day of April, 1890.

WARREN S. BELDING.

Witnesses:
CYRUS KEHR,
AMBROSE RISDON.